(No Model.)

S. S. ELDER.
TIRE FOR VEHICLE WHEELS.

No. 569,864. Patented Oct. 20, 1896.

WITNESSES:
Edward Thorpe

INVENTOR
S. S. Elder
BY
Munn & Co.
ATTORNEYS.

UNITED STATES PATENT OFFICE.

SAMUEL S. ELDER, OF SPRINGFIELD, ILLINOIS.

TIRE FOR VEHICLE-WHEELS.

SPECIFICATION forming part of Letters Patent No. 569,864, dated October 20, 1896.

Application filed December 2, 1895. Serial No. 570,802. (No model.)

*To all whom it may concern:*

Be it known that I, SAMUEL S. ELDER, of Springfield, in the county of Sangamon and State of Illinois, have invented a new and useful Improvement in Tires for Wheels, of which the following is a full, clear, and exact description.

My invention relates to an improvement in tires for wheels, and especially to tubular cushioned tires.

The object of the invention is to provide a tubular cushioned tire which will not be injured to any appreciable extent upon being punctured, and, furthermore, to so construct the said tire that it may be expeditiously and readily applied to or disconnected from the rim of the wheel, and whereby also the said tire will be exceedingly elastic and will possess all of the qualifications of a pneumatic tire without its disadvantages.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1:
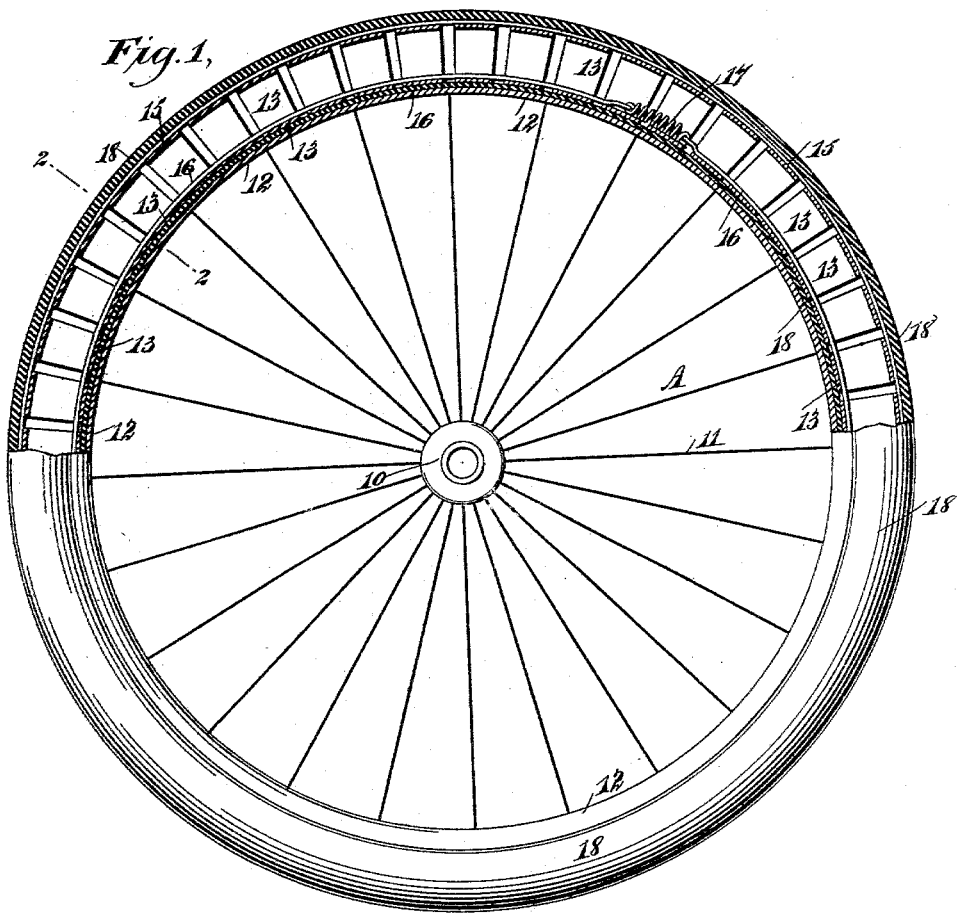
Figure 2:
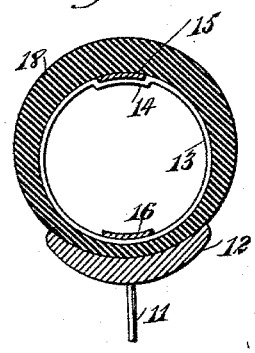

Figure 1 is a partial side elevation and partial sectional view of a wheel and the improved tire secured thereon, and Fig. 2 is a transverse section taken practically on the line 2 2 of Fig. 1.

The wheel A is of the ordinary construction, and comprises a hub 10, spokes 11, and a rim 12, the latter being provided with a concaved outer face. The body of the tire is made up of a series of practically circular or endless springs 13, arranged at slight intervals apart, being of sufficient number, so that when properly grouped they will extend entirely around the rim of the wheel, against which they are adapted to have a bearing. Each spring of the group is preferably provided with a depression 14 in its upper face, and all of the springs are bound together by means of a band 15, which fits neatly into the depressions 14 of the springs, the band being practically endless, and it is secured by solder, rivets, or the equivalents thereof to each of the said springs. The various springs are also held in their circular arrangement by means of a second band 16, which is passed loosely through the various circular springs, engaging with their inner faces at the bottom, and the band 16 is united at its ends by means of a coiled spring 17, or the equivalent thereof, in order that the series of circular body-springs may be readily sprung over on the rim of the wheel or removed therefrom, since the inner clamping-band will give to a greater or less extent by reason of the spring at its ends, and the circular body-springs will yield under lateral pressure sufficiently to admit of the tire leaving the wheel under pressure suitably applied, and when the pressure is removed and the tire is on the rim of the wheel the body-springs will expand and the clamping-band will contract to hold the tire in position on the wheel. The upper band 15 may be termed a "tie-band."

In order that the various body-springs may be properly assembled to form the body of the tire with the least possible space between them, the said body-springs are wider at the top than at the bottom, and this peculiar formation of the body-springs also adds in a measure to their elasticity at the tread of the tire, as each spring affords a wide bearing-surface and the brakes between the springs are not so very numerous.

The entire body just described is provided with a covering 18 of any elastic or yielding material, such as rubber, leather, or their equivalents.

By reference to the drawings it will be seen that the tie-band 15 extends entirely around the periphery of the wheel and forms the tread thereof, being inclosed within the covering 18, and supported in place elastically by means of the springs 13, so that the wheel when finished is given a substantially even and uniform curved surface at its tread and has no recesses or spaces interposed between the covering 18 and the tie-band 15 at the tread. By this construction the running of the wheel is made much more even and steady, and the liability of damage resulting from puncture is lessened.

Having thus described my invention, I claim as new and desire to secure by Letters Patent—

In a tire, the combination of a clamping-band, a tie-band surrounding and of greater diameter than the clamping-band, a covering extending over said bands, the tie-band being arranged at the tread of the tire, and a series of circular springs interposed between the tie-band and the clamping-band and secured at their inner sides to the clamping-band, each of said springs having at its outer portion a recess formed in it to receive the inner side of the tie-band, said circular springs and the tie-band having their outer surfaces flush, substantially as set forth.

SAMUEL S. ELDER.

Witnesses:
F. W. VOWELL,
C. G. SEEBERGOR.